United States Patent [19]

Rees

[11] Patent Number: 4,779,832
[45] Date of Patent: Oct. 25, 1988

[54] MANUALLY OPERABLE SEAT ADJUSTOR ASSEMBLY

[75] Inventor: Richard W. A. Rees, Holland Landing, Canada

[73] Assignee: General Motors Corporation, Detroit, Mich.

[21] Appl. No.: 75,513

[22] Filed: Jul. 20, 1987

[51] Int. Cl.$^4$ ............................................ F16M 13/00
[52] U.S. Cl. ..................................................... 248/421
[58] Field of Search .................... 248/421, 422, 162.1, 248/123.1, 157, 371; 297/347, 345; 296/65 R

[56] References Cited

U.S. PATENT DOCUMENTS

| | | | |
|---|---|---|---|
| 3,743,230 | 7/1973 | Freedman | 297/309 X |
| 3,853,296 | 12/1974 | Forssell | 248/421 X |
| 4,067,533 | 1/1978 | Kazaoka | 297/328 X |
| 4,248,480 | 2/1981 | Koucky et al. | 296/65 R X |
| 4,422,611 | 12/1983 | Kitsuda | 248/421 |
| 4,423,904 | 1/1984 | Crawford | 296/65 R X |
| 4,455,009 | 6/1984 | Foster et al. | 248/561 |
| 4,461,511 | 7/1984 | Berneking et al. | 297/355 |
| 4,556,185 | 12/1985 | Takagi | 248/421 |
| 4,629,151 | 12/1986 | Nishino | 248/421 X |
| 4,648,575 | 3/1987 | Kawade | 248/421 X |
| 4,648,578 | 3/1987 | Sakamoto | 248/421 X |
| 4,650,148 | 3/1987 | Sakamoto | 248/421 X |

*Primary Examiner*—Ramon O. Ramirez
*Attorney, Agent, or Firm*—Patrick M. Griffin

[57] ABSTRACT

A manually operable seat adjustor assembly that combines the ease of operation of a long lever actuator, with the compactness of a short handle actuator. A handle assembly including an outer casing and an inner push rod movable within is pivoted to the side of the seat pan in common with a rear link of the seat supporting linkage. The tip of a locking rod passes through one of a series of positive detents, through a straight slot in the rear link, and through a clearance slot in the casing that has a straight portion alignable with the rear link straight slot. When the slots are so aligned, pushing on the push rod moves the locking rod tip out of the detent to free the linkage and into the aligned slots to rigidly hold the handle assembly to the rear link. Then, the linkage may be easily moved with the mechanical advantage of the entire handle, but when the handle is released, it pivots down freely under its own weight about the common pivot to an out of the way stored position alongside the seat pan.

2 Claims, 4 Drawing Sheets

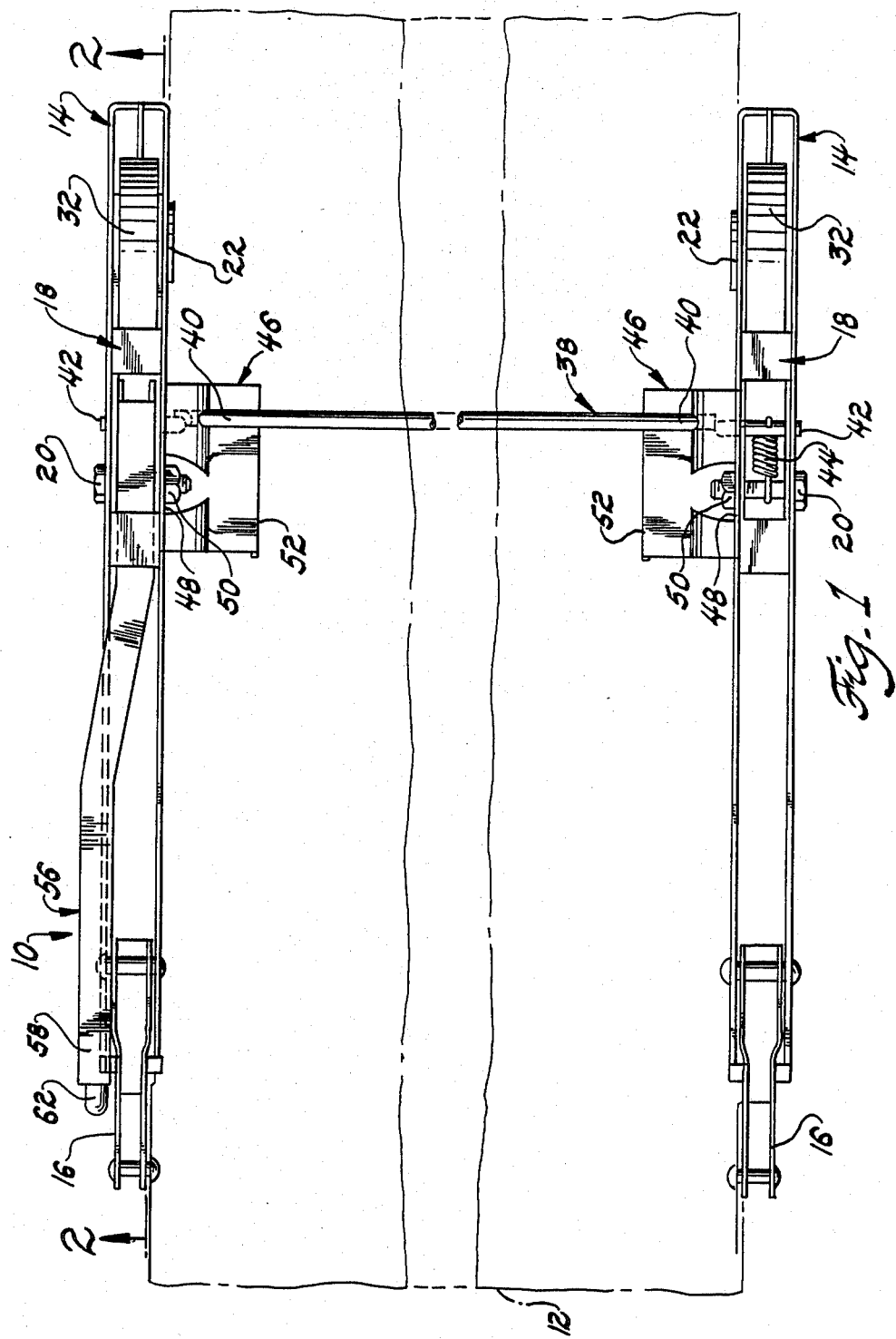

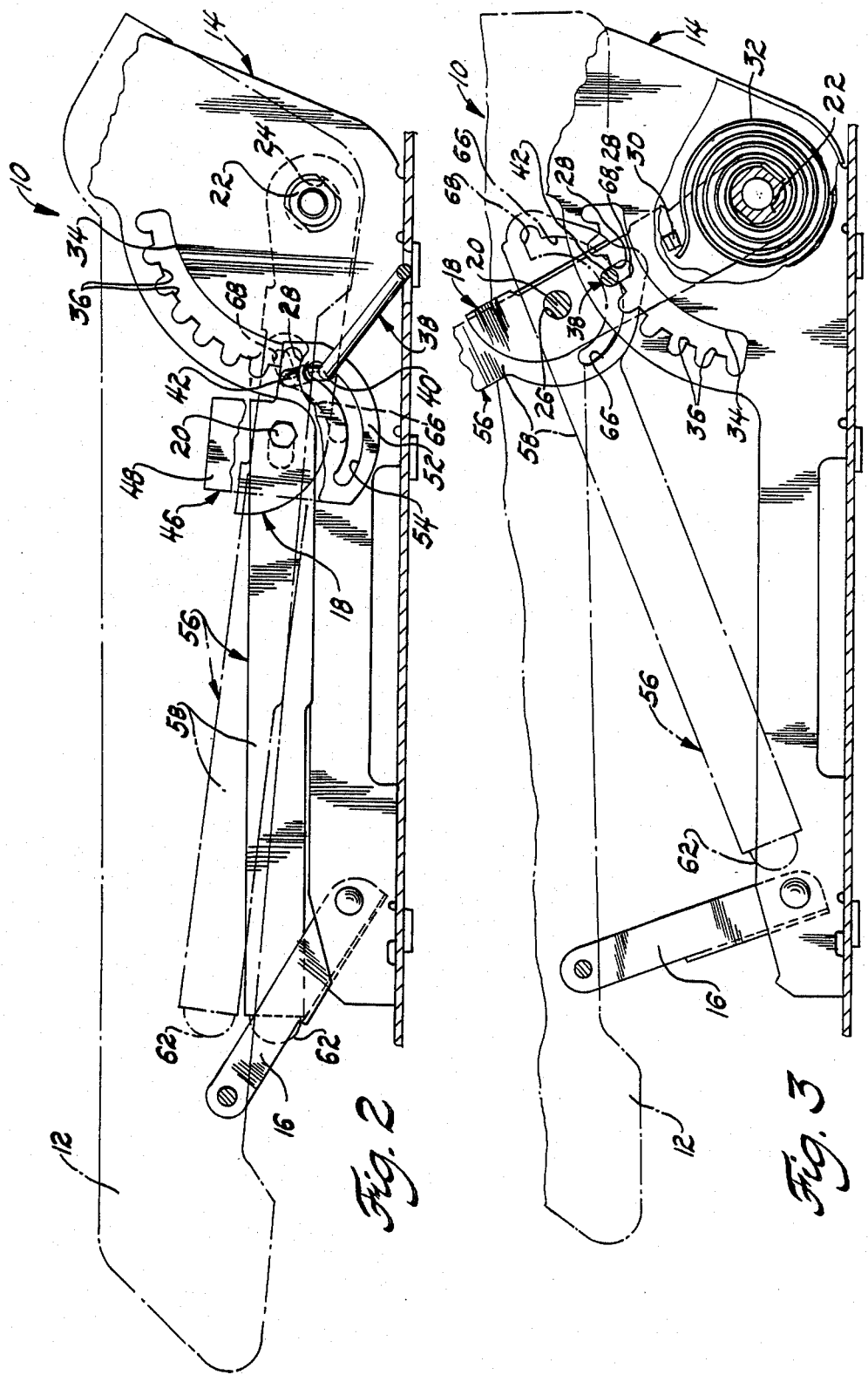

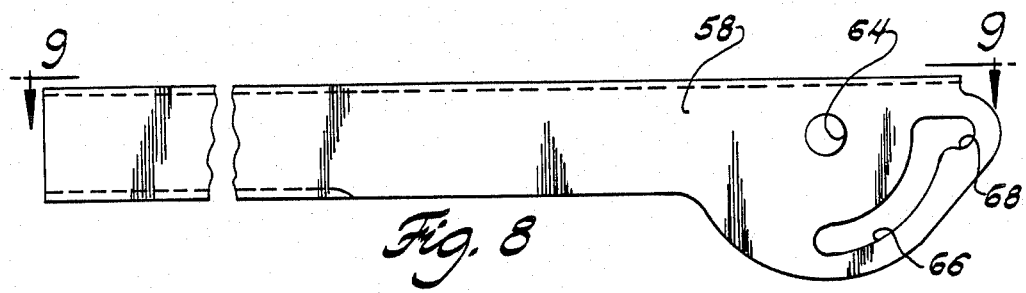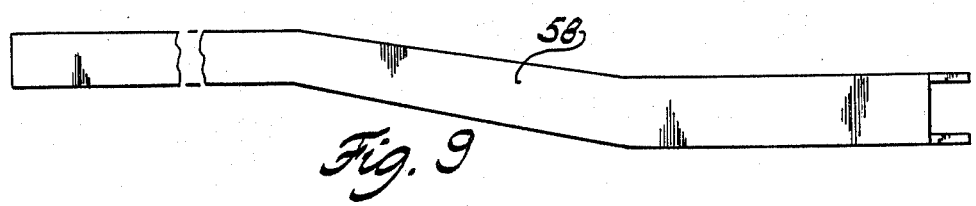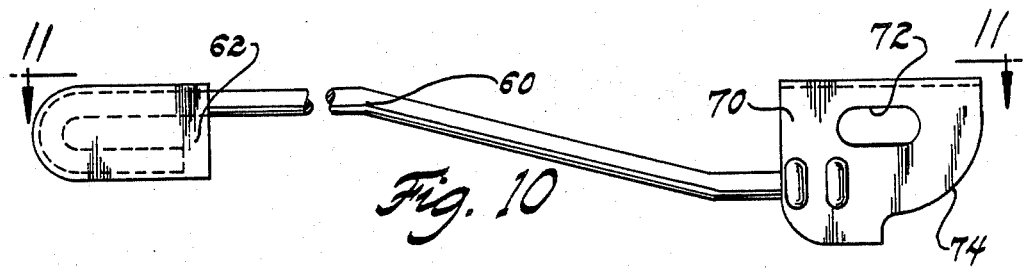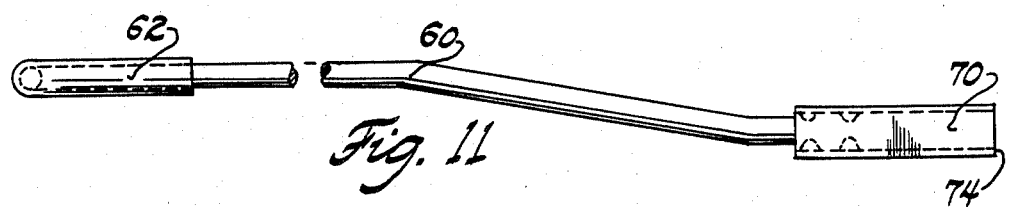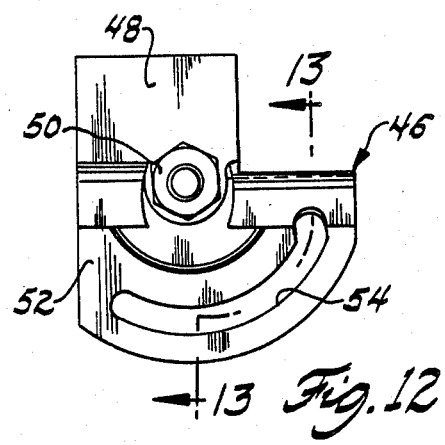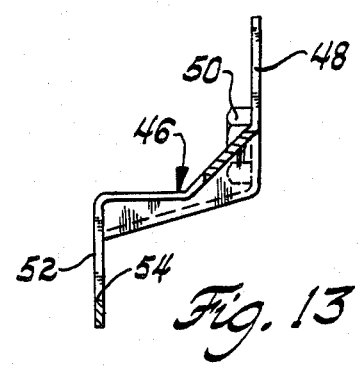

MANUALLY OPERABLE SEAT ADJUSTOR ASSEMBLY

This invention relates to vehicle seats in general, and specifically to a manually operable vehicle seat adjustor assembly that is particularly compact and easily actuated.

BACKGROUND OF THE INVENTION

Powered vehicle seat height adjustors are typically actuated by a simple switch, which is undeniably simple, compact, and easy for a seat occupant to operate. However, the expense of powered systems is such that there is a continued interest in manually operable systems. In a manually operable seat height adjustor, there is the need for some kind of mechanical actuator, which generally takes the form of a lever that is grasped by the operator and rotated or lifted from an inoperative to an operative position. Clearly, as with any lever, the ease with which such an actuator may be operated is directly proportional to its length, the longer being the easier to operate. Conversely, its compactness suffers with increased length. A long lever rigidly joined to one element of a linkage would move that element of the linkage easily, but would likely, at least some point in its path of travel, extend above the level of the seat or otherwise extend into an undesired space in the interior of the vehicle. Consequently, such lever actuators are typically quite short, or are limited as to how far they rotate up or down.

A further shortcoming of many manual seat height adjustors is that the lever actuator, whatever its length, does no more than unlock a linkage that has a counterbalancing spring in it. Then it is up to the seat occupant to shift his or her weight up or down with the help only of the counterbalancing spring. The actuating lever is not held to any part of the linkage so that its mechanical advantage, however small it might be, can be used to assist in shifting the seat up or down. There is a known type of seat adjustor in which a telescoping handle is pulled out and rotated up or down, so as to be long when in use, but shorter and out of the way when not in use. This actuator also has a clutch spring that wraps a shaft of the linkage so that the mechanical advantage of the lever can be used by the operator seat occupant to assist in shifting up or down. There are limitations, however, to how rigidly a wrapping clutch spring can hold the shaft, and the stiffness of a telescoping tube is limited to the amount of metal overlap at the joint between its sections.

SUMMARY OF THE INVENTION

The subject invention provides a manually operable vehicle seat adjustor assembly that has the actuation ease of a long lever actuator, yet which is effectively compact. Furthermore, the actuator does not have the limitations noted above, in that the handle assembly, though relatively long, need not be telescoped when not in use, and it is much more rigidly held to the linkage than a wrapping clutch spring would allow. In addition, the preferred embodiment disclosed concurrently provides an advantageous means of preventing the seat from becoming unlocked at any given height.

The cushion support, or seat pan of the seat, which is the driver's seat in the embodiment disclosed, is supported on the vehicle floor for vertical movement by a pair of four bar linkages. The top bar of the linkage consists of the seat pan itself, which is pivoted to a front and a rear link on each side thereof. The bottom bar of each of the four bar linkages is a main frame, which is mounted to the vehicle floor. Each of the rear links has a straight slot therein intermediate the points where it is pivoted to the seat pan and the main frame. A counterbalancing spring means acts between the main frame and each rear link to substantially counteract the weight of the seat occupant. Each main frame has a series of positive detents arranged along an arc about the rear link-main frame pivot point which, in the embodiment disclosed, consist of a series of teeth on one edge of an arcuate slot. These detents keep the seat pan locked at one of a series of selected heights, one height corresponding to each detent, in cooperation with other structure described below.

The handle assembly that actuates the adjustor assembly is located on the right hand side of the seat pan and includes an elongated outer casing and an inner elongated push rod, the front end of which extends out of the front of the casing. The push rod is movable within the casing by thumb pressure from the operator. The casing is pivoted commonly to the rear link-cushion support pivot and has a slot therein with an arcuate portion defined about that common pivot and a straight portion extending generally along the axis of the casing. The straight portion of the slot in the handle assembly casing is sized so that the handle assembly may be rotated to what may be termed a ready position, where the casing slot straight portion and rear link straight slot are aligned. The back end of the push rod also has a pusher bar attached thereto which has an arcuate back edge, which arcuate edge is shaped so as to be locatable generally contiguous to the casing slot arcuate portion.

The structure that actually keeps the seat pan locked at any of the available heights is a locking rod that runs beneath the seat pan, and which has two tips or ends bent out therefrom, each of which extends through a straight slot in a rear link and between a corresponding pair of adjacent teeth in each main frame. A tension spring hooked between the locking rod and the common pivot continually pulls the ends of the locking rod end into engagement between the teeth so that the rear link is prevented from moving relative to the frame and the seat pan is locked at a given height. The same spring pulls one end of the locking rod against the arcuate edge of the pusher bar. One of the locking rod ends also extends closely through the casing slot arcuate portion. Therefore, when the seat is locked at a given height, the handle assembly will naturally fall under its own weight to a stored position along the side of the seat pan as the locking rod end moves freely through the casing slot arcuate portion and along the arcuate back edge of the push rod. Thus, despite its length, the handle assembly rests compactly out of the way, as would a short handle. In addition, the capture of the locking rod end within the casing slot arcuate portion prevents the locking rod end from moving out of engagement between the detent teeth, providing a secondary lock.

To change the height, the driver-operator pulls the handle casing up to the ready position defined above, and then pushes in with a thumb on the end of the elongated push rod. Until the ready position is reached, the push rod will not be able to move significantly. At the ready position, the back edge of the pusher bar pushes the locking rod end out from between the detent teeth and into the now aligned rear link straight slot and straight portion of the casing slot, against the pull of the tension spring. This serves to rigidly hold the casing to the rear link so that the operator may easily rotate the rear link up or down to move the seat pan to a different height. This may be done without a great deal of effort, given the cooperation of the counterbalancing spring and the relatively long lever arm of the handle assembly. At the desired height, the long handle assembly may extend up far above the seat pan. Once the desired height is reached, however, the operator releases the thumb pressure, which allows several things to happen simultaneously under the force of the tension spring. The locking rod end is pulled out of the casing slot straight portion and back into the casing slot arcuate portion, and also between the closest pair of detent teeth. This locks the seat pan at the new height. Then, the operator releases the handle assembly, which falls again to the stored position, and out of the way. The advantages of both a short and a long handle are achieved, as well as the automatic capturing of the locking rod end to provide the secondary lock.

It is, therefore, an object of the invention to provide a manually operable seat adjustor assembly that combines the ease of operation that comes from the mechanical advantage of a relatively longer actuating handle assembly with the compactness of a relatively shorter actuating handle assembly.

It is another object of the invention to provide such a seat adjustor assembly in which the handle assembly includes an outer casing and an inner push rod which together are pivoted to a seat supporting linkage in such a way that the handle assembly will fall under its own weight to stored, out of the way position along side the seat, but may be lifted up from the stored position to a ready position where the push rod may be pushed within the casing to hold the handle assembly rigidly to part of the linkage, so that the linkage may be easily moved to raise and lower the seat with a lever arm corresponding to substantially the entire length of the handle assembly.

It is yet another object of the invention to provide such an adjustor assembly in which the seat supporting linkage includes a link with a straight slot therein and a main frame with a series of detents therein, and in which the handle assembly casing is pivoted to the seat commonly with the rear link and also has a straight slot therein alignable with the link straight slot when the handle assembly is in the ready position, and in which a locking member extends through the link straight slot and is normally biased to a position engaged with one of the detents, but out of the casing straight slot, and proximate to but clear of the back end of the push rod, so that, in the ready position, the back end of the push rod may be moved within the casing by the operator to push the locking member out of the detent and into the aligned straight slots to rigidly hold the handle assembly to the link, thereby allowing the seat height to be adjusted with the mechanical advantage of substantially the entire length of the handle assembly, while release of the push rod by the operator will allow the handle assembly to fall again to the stored position.

DESCRIPTION OF THE PREFERRED EMBODIMENT

These and other objects and features of the invention will appear from the following written description, and from the drawings, in which:

FIG. 1 is a plan view showing the seat supporting linkage, the locking rod, and showing the handle assembly in its stored position;

FIG. 2 is a sectional side view taken along the line 2—2 of FIG. 1 and showing the seat pan locked in a lower position and the handle assembly in the stored position, with the ready position shown in dotted lines;

FIG. 3 is a view like FIG. 2, but showing the seat pan raised to a higher position, and showing the new stored position of the handle assembly in dotted lines;

FIGS. 8 and 9 are side and top views of the casing of the handle assembly;

FIGS. 10 and 11 are side and top views of the push rod of the handle assembly;

FIGS. 12 and 13 are side and top views of a support bracket that provides strength and cradles part of the locking rod.

Figure 4:
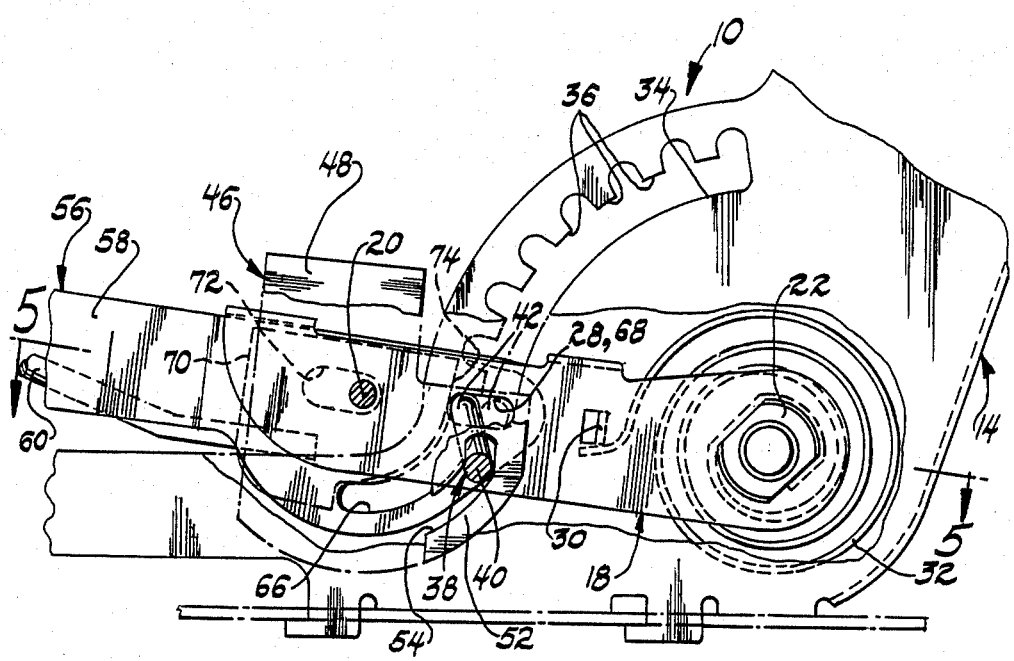
FIG. 4 is an enlargement of a portion of FIG. 2, showing the handle assembly in the ready position, and showing the engaged position of the locking rod in solid lines, and the disengaged position in dotted lines.

Referring first to FIGS. 1 and 2, the preferred embodiment of the seat adjustor assembly of the invention, designated generally at 10, is used to manually adjust the height of a seat cushion support, or seat pan, 12, which is of stamped metal construction. The vehicle seat would also have a seat back, not shown. The seat pan 12 disclosed is located on the driver's side, although any seat could be used. Seat pan 12 is supported by a supporting linkage that includes two four bar linkages, one on each side, as best seen in FIG. 1. The top bar of each linkage is provided by the seat pan 12 itself. The lower bar of each linkage is provided by a main frame, designated generally at 14, which is formed as a two walled structure and which is mounted either to the vehicle floor or to a floor mounted horizontal position adjustor, not shown. A pair of front links 16 are pivoted between the front of seat pan 12 and the main frames 14. A pair of rear links, designated generally at 18, are pivoted between the rear of seat pan 12 and the main frames 14 by a bolt 20 at the top, and a flat sided pivot sleeve 22 at the bottom. Each bolt 20 is actually affixed to seat pan 12 indirectly through other structure, described below. As best seen in FIG. 1, each front and rear link 16 and 18 is also formed as a two walled structure, but they are narrow enough to fit closely within the walls of the main frames 14. As the seat pan 12 moves up or down, the front and rear links 16 and 18 swing clockwise or counterclockwise respectively. Structure described below releasably holds the seat supporting linkage rigidly at a selected number of positions, thus holding the seat pan 12 at a selected number of discrete heights.

Figure 6:
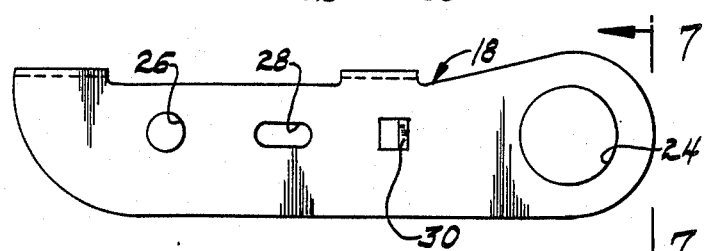
FIGS. 6 and 7 are side and end views of one of the rear links of the seat supporting linkage.
Figure 7:
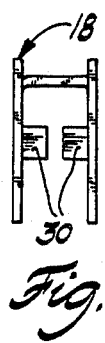

Referring next to FIGS. 4, 6 and 7, each of the rear links 18 has a larger round hole 24 at the bottom, a smaller round hole 26 near the top, and an intermediate straight slot 28. Since most of the components described below are double walled, any slots or holes therethrough actually comprise opposed pairs of holes or slots, one through each wall of the component. Since they are aligned, however, they may be conveniently referred to as single slots or holes, which is how they appear in most of the views. Pivot sleeve 22 passes through the larger round hole 24, and bolt 20 passes through the smaller round hole 26. A pair of inwardly bent tabs 30 provide a hook for one end of a clock spring, which is also wrapped around the flat sides of pivot sleeve 22 so as to provide a counterbalancing torque continually acting to rotate each rear link 18 clockwise relative to the main frames 14, substantially counteracting the weight of a seat occupant. Each main frame 14 also has a generally arcuate slot therein defined by a smooth back edge 34 and a serrated front edge comprising seven teeth 36. The seven teeth 36 provide an arcuate series of eight positive detents arranged along an arc about the axis of pivot sleeve 22.

Figure 5:
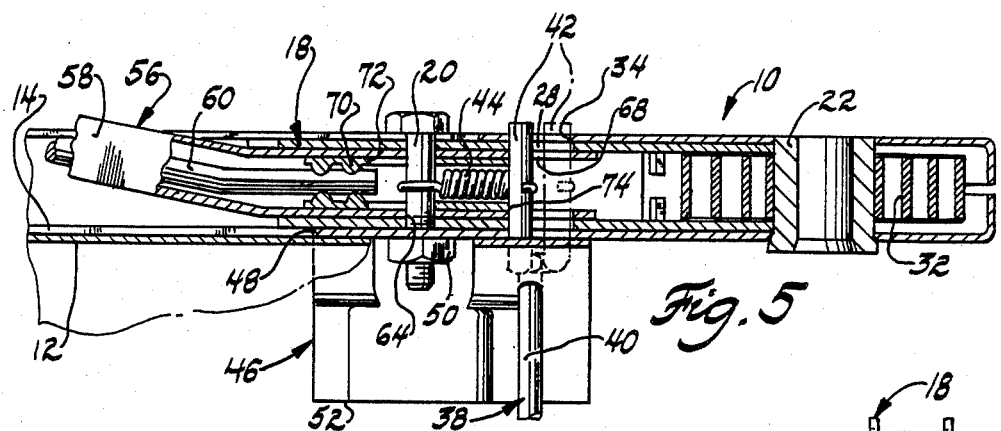
FIG. 5 is a sectional view taken along the line 5—5 of FIG. 4.

Referring next to FIGS. 4, 5, 12 and 13, a locking member is provided by a locking rod, designated generally at 38, which runs beneath seat pan 12 in the center and which is bent up and then out at each end to provide a horizontal leg 40 and a horizontal tip 42. Rod tips 42 extend through the rear link straight slots 28 and are also engageable between any adjacent pair of teeth 36. A tension spring 44 hooked between each rod tip 42 and bolt 20 continually biases each locking rod tip 42 to the left, as seen in FIG. 5, so as to be engaged between one of the seven adjacent pairs of teeth 36. Since the rod tips 42 also pass through the rear link straight slots 28, the rear links 18 are thereby locked relative to the main frames 14 to lock the seat pan 12 in one of eight corresponding vertical heights. As mentioned above, the upper ends of the rear links 18 are not pivoted directly to seat pan 12. Instead, a pair of support brackets, best seen in FIGS. 12 and 13 and designated generally at 46, is joined to each side of seat pan 12. Each support bracket 46 includes an upper vertical wall 48, to the inside of which is welded a nut 50, and an offset, lower vertical wall 52, in which is formed an arcuate slot 54. Each upper vertical wall 48 is welded to the outside surface of one side of seat pan 12, as best seen in FIG. 5, which shows the seat pan 12 structure broken away to reveal the nut 50. Seat pan 12 may be locally inwardly deformed or broken away to provide clearance for the nut 50. Bolt 20, then, is actually threaded into nut 50 to provide the upper pivot of the rear links 18. Brackets 46 provides another function, as well. The horizontal legs 40 of the locking rod 38 are cradled in the support bracket slots 54. Arcuate slots 54 thus provide a floating pivot bearing surface to allow the rod tips 42 to swing back and forth about the legs 40, from the solid to the dotted line position of FIG. 4, at any height of seat pan 12. When the rod tips 42 move as shown in FIG. 4, out from between an adjacent pair of teeth 36 and against the main frame slot back edge 34, it will be understood that the rear links 18 are thereby unlocked from the main frames 14, and as the seat pan 12 is moved up or down to a new vertical position, the rod tips 42 will move along the arcuate back edge 34. The actuating structure that allows the rod tips 42 and the seat pan 12 to be so moved without a great deal of effort will be described next.

Referring next to FIGS. 2, 4, 5 and FIGS. 8 through 11, the structure that actuates or operates the seat adjustor assembly 10 of the invention is a handle assembly, designated generally at 56. Handle assembly 56 is pivoted to the right side of seat pan 12 by the bolt 20, commonly with and between the walls of the rear link 18. Handle assembly 56 is relatively long from front to back, and can be easily grasped by the seat occupant-operator by reaching down on the side of seat pan 12 with the right hand. Handle assembly 56 is made up of an elongated and hollow outer casing 58 of stamped and rolled metal and an inner elongated push rod 60 bent from steel bar. The front end of push rod 60 has a plastic thumb button 62, which extends out of the front of the casing 58, so that push rod 60 may be slidably moved within casing 58 by the operator applying thumb pressure to button 62. Casing 58 has a round hole 64 cut through each of its walls near the back end therefor, as well as a slot that consists of an arcuate portion 66 defined about the center of the round hole 64 and a straight portion 68 extending generally along the axis of casing 58. The casing slot straight portion 68 is sized similarly to the rear link straight slots 28, and may thus be aligned therewith, as will be further described below. The back end of push rod 60 has a pusher bar 70 welded thereto, also a double walled component, which has a straight clearance slot 72 therethrough, and an arcuate back edge, actually a double back edge, 74. As best seen in FIG. 5, bolt 20 passes through the aligned round holes 64 in casing 58, and also through the aligned straight clearance slots 72 in pusher bar 70. As best seen in FIG. 5, the right hand rod tip 42, in addition to passing through the straight slot 28 in the right hand rear link 18 and through an adjacent pair of teeth 36 on the right hand main frame 14, also passes through the arcuate slot portion 66 in casing 58. As best shown in FIG. 4 in solid lines, when the right hand locking rod tip 42 is between a pair of teeth 36, it also rests near, almost against, the arcuate back edge 74 of pusher bar 70, kept there by the force of the tension spring 44. The arcuate back edge 74 is also essentially contiguous to the casing slot arcuate portion 66. Remembering that the casing slot arcuate portion 66 is defined about the center of the common pivot of bolt 20, it will be understood that, the handle assembly 56 may freely pivot about bolt 20, with the right hand rod tip 42 moving through the casing slot arcuate portion 66 and concurrently riding along, or near, the pusher bar arcuate back edge 74 without significant resistance. Thus, the handle assembly 56 may freely fall under its own weight to what may be termed a stored position, alongside the seat pan 12 and out of the way, which position is shown by solid lines in FIG. 2. Thus, despite its relatively long length, when it is not needed, handle assembly 12 is as effectively compact and out of the way as a conventional short handle.

Referring next to FIG. 2, to change the height of seat pan 12, the driver-operator pulls the handle casing 58 with the right hand up from the stored to the dotted line position, which may be termed the ready position of handle assembly 56. The ready position is defined as that point where the casing slot straight portion 68 aligns with the right rear link straight slot 28. The operator will know when that ready position has been reached, because the handle assembly 56 will stop at that point, when the locking rod tip 42 can travel no more through the casing slot arcuate portion 66. While the handle assembly 56 is lifted, the operator can apply thumb pressure to button 62, which would force pusher bar arcuate back edge 74 into the right hand locking rod tip 42. However, until the ready position is reached, the locking rod tip 42 cannot be pushed out from between that pair of teeth 36 between which it is then engaged. This is because the locking rod tip 42 is captured closely within the casing slot arcuate portion 66, which thereby provides a secondary or redundant lock for the seat pan 12. Furthermore, even if thumb pressure is applied while the handle assembly 56 is being lifted to the ready position, the pusher bar 70 will remain substantially in its starting position, because the arcuate back edge 74, riding along the locking rod tip 42, serves to keep rod 60 from moving significantly within casing 58.

Referring next to FIGS. 3 and 4, at the ready position, the pusher bar 70 can now move the right locking rod tip 42 from the solid line to the dotted line position of FIG. 4, as described above. The support bracket arcuate slot 54 will cradle the locking rod horizontal legs 40 at any seat height to continuously provide a pivot for the rocking motion of the locking rod tips 42. The slot 72 in pusher bar 70 provides clearance from bolt 20. The right locking rod tip will move out of the casing slot arcuate portion 66 into the now aligned straight slots 28 and 68, stretching the springs 44, which movement will be noticed by the operator as an inward motion of the thumb. This movement of the right locking rod tip 42 will be matched by the left hand locking rod tip, which will serve to simultaneously free the rear links 18 from the main frames 14, as well as to rigidly hold the handle assembly 56 to the right rear link 18. This rigid holding is provided by two points of connection between the right rear link 18 and the casing 58, these being the already existing common pivot connection of the bolt 20, and the capture of the right hand locking rod tip 42 within the now aligned straight slots 28 and 68. Remembering that the components are double walled, so that each slot is in fact a pair of opposed slots, it will be appreciated that the connection between the right rear link 18 and the handle assembly 56 is very rigid and solid indeed. Now, given the mechanical advantage of the relatively long lever arm of the handle assembly 56 and the cooperating uplift of the clock spring 32, the operator can easily shift his weight and the seat pan 12 up or down, in this case up, to the new position of FIG. 3. If the handle assembly were to remain at the solid line position of FIG. 3, as a conventional, one piece actuator would, it would be very much in the way. However, at this point, release of the thumb button 62 will allow the stretched tension springs 44 to contract again and pull the locking rod tips 42 back into engagement with the closest adjacent pair of teeth 36, locking seat pan 12 at the new height, while simultaneously moving push rod 60 and button 62 back out. At the same time, the right locking rod tip 42 will move back into the casing slot arcuate portion 66. Then, the operator releases the handle assembly 56, which falls again out of the way to the stored position, shown in dotted lines in FIG. 3. Thus, the advantages of both a long and short actuator are achieved. An additional advantage and feature is that, if the seat pan 12 is not at exactly the right position for the locking rod tips 42 to be able to move between a pair of detent teeth 36, the handle assembly 56 cannot fall to the stored position, so the operator will have an immediately apparent indicator that the seat pan 12 needs to be adjusted up or down a final amount.

Variations of the preferred embodiment 10 may be made within the spirit of the invention. For example, the arcuate casing slot portions 66 and their close capture of the right hand locking rod tip 42 are not strictly necessary, as long as sufficient clearance is provided between casing 58 and locking rod tip 42 to allow handle assembly 56 to fall freely to the stored position. However, the redundant lock so provided is a real advantage, and is had with no extra components. Likewise, the push rod 60 could be provided with its own return spring within casing 58. However, the arrangement of the preferred embodiment 10 with the pusher bar arcuate edge 74 allows the tension springs 44 to do double duty, in effect, and allows the push rod 60 to work with very little lost motion. Likewise the continuous cradling pivot provided to locking rod 38 by the support brackets 46 could instead be provided by a separate link between the seat pan 12 and the locking rod horizontal legs 40. However, the support brackets 46 act very efficiently to provide both that rocking pivot and the strengthening of the upper pivot connection between the rear links 18 and the seat pan 12. Therefore, it will be understood that the invention is capable of being embodied in structures other than that disclosed, and is not intended to be so limited.

The embodiments of the invention in which an exclusive property or privilege is claimed are defined as follows:

1. A compact and easily actuatable seat adjuster assembly for manually adjusting the vertiacl height of the cushion support of a vehicle seat, comprising, a main frame mounted to said vehicle, a front link pivoted to both said main frame and to said cushion support, a rear link pivoted both to said main frame and to said cushion support, said rear link further having an intermediate straight slot, counterbalancing means acting to substantially counteract the weight of a seated adjuster assembly operator, a series of positive detents arranged along an arc about said rear link-main frame pivot, a handle assembly including an elongated outer casing and an inner elongated push rod, said push rod extending out of the front of said casing, said casing also being pivoted commonly to said rear link-cushion support pivot and extending forward from said rear link-cushion support pivot far enough to be easily grasped by said operator, said casing further having a slot therein with an arcuate portion defined about said common pivot and a straight portion extending generally along the axis of said casing and sized so that said handle assembly may be rotated to a ready position where said casing slot straight portion and rear link straight slot are aligned, a locking member engageable with any of said positive detents and also extending through said rear link straight slot and closely through said casing slot arcuate portion, biasing means acting to continually bias said locking member into engagement with one of said detents whereby said rear link is prevented from moving relative to said frame and said cushion support is locked at a corresponding height, said biasing means also acting to concurrently bias said locking member out of said casing slot straight portion and into said casing slot arcuate portion and to a position proximate but clear of the back end of said push rod, so that said handle assembly will naturally fall to a stored position along the side of said cushion support as said locking member moves through said casing slot arcuate portion, whereby said locking member is captured within said casing slot arcuate portion until said handle assembly is rotated up from said stored position to said ready position, whereupon the operator pushes said push rod into said casing, thereby pushing said locking member out of engagement with said detent and into said aligned casing slot straight portion and rear link straight slot, thereby rigidly holding said casing relative to said rear link so that an operator may rotate said rear link up or down to move said cushion support to a different height in conjunction with said counterbalancing means with a lever arm corresponding to substantially the entire length of said handle assembly, at which point the operator releases said push rod to allow said biasing means to move said locking member into a different detent and back into said said casing slot arcuate portion, thereby recapturing said locking member and allowing said handle assembly to fall back to said stored position.

2. A compact and easily actuatable seat adjuster assembly for manually adjusting the vertical height of the cushion support of a vehicle seat, comprising, a main frame mounted to said vehicle, a front link pivoted to both said main frame and to said cushion support, a rear link pivoted both to said main frame and to said cushion support, said rear link further having an intermediate straight slot, counterbalancing means acting to substantially counteract the weight of a seated adjuster assembly operator, a series of positive detents arranged along an arc about said rear link-main frame pivot, a handle assembly including an elongated outer casing and an inner elongated push rod, said push rod extending out of the front of said casing, said casing also being pivoted commonly to said rear link-cushion support pivot and extending forward from said rear link-cushion support pivot far enough to be easily grasped by said operator, said casing further having a slot therein with an arcuate portion defined about said common pivot and a straight portion extending generally along the axis of said casing and sized so that said handle assembly may be rotated to a ready position where said casing slot straight portion and rear link straight slot are aligned, said push rod further having an arcuate back edge defined about said common pivot contiguous to said casing slot arcuate portion, a locking rod having an end engageable with any of said main frame detents and extending through said rear link straight slot and closely through said casing slot arcuate portion, a tension spring hooked between said locking rod and said common pivot to continually pull said locking rod end into engagement with one of said detents, so that said rear link is prevented from moving relative to said frame and said cushion support is locked at a corresponding height and so that said handle assembly will naturally fall to a stored position along the side of said cushion support as said locking rod end moves through said casing slot arcuate portion and along the arcuate back edge of said push rod, whereby said locking member is captured within said casing slot arcuate portion until said handle assembly is rotated up from said stored position to said ready position, whereupon the operator pushes said push rod into said casing, thereby stretching said tension spring and pushing said locking rod end with said push rod back edge out of engagement with said detent and into said aligned casing slot straight portion and rear link straight slot, thereby rigidly holding said casing relative to said rear link so that an operator may rotate said rear link up or down to move said cushion support to a different height in conjunction with said counterbalancing means with a lever arm corresponding to substantially the entire length of said handle assembly, at which point the operator releases said push rod to allow said tension spring to pull said locking rod end into a different detent and back into said said casing slot arcuate portion, thereby recapturing said locking member and allowing said handle assembly to fall back to said stored position.

* * * * *